(12) United States Patent
Prior et al.

(10) Patent No.: US 8,359,845 B2
(45) Date of Patent: Jan. 29, 2013

(54) EXHAUST HEAT RECOVERY AND EXHAUST GAS RECIRCULATION WITH COMMON HEAT EXCHANGER

(75) Inventors: Gregory P. Prior, Birmingham, MI (US); Daniel B. Glassford, Dryden, MI (US)

(73) Assignee: GM Global Technology Operations LLC, Detroit, MI (US)

(*) Notice: Subject to any disclaimer, the term of this patent is extended or adjusted under 35 U.S.C. 154(b) by 762 days.

(21) Appl. No.: 12/580,291

(22) Filed: Oct. 16, 2009

(65) Prior Publication Data

US 2011/0088672 A1  Apr. 21, 2011

(51) Int. Cl.
*F01N 3/02* (2006.01)
*F02M 25/07* (2006.01)
*F02B 47/08* (2006.01)

(52) U.S. Cl. .................................. 60/320; 123/568.12
(58) Field of Classification Search .......... 123/568.12; 60/320, 321, 324, 605.2; 165/103
See application file for complete search history.

(56) References Cited

U.S. PATENT DOCUMENTS

| | | | |
|---|---|---|---|
| 7,168,419 B2 * | 1/2007 | Rosin et al. | 123/568.12 |
| 7,581,533 B1 | 9/2009 | Moran | |
| 7,588,018 B2 * | 9/2009 | Modien et al. | 123/568.12 |
| 8,230,681 B2 * | 7/2012 | Kobayashi et al. | 123/568.12 |
| 2007/0062178 A1 * | 3/2007 | Yang | 60/320 |
| 2008/0223317 A1 | 9/2008 | Shintani et al. | |

* cited by examiner

*Primary Examiner* — Willis R Wolfe, Jr.
(74) *Attorney, Agent, or Firm* — Quinn Law Group, PLLC

(57) ABSTRACT

An apparatus for a vehicle with an engine is provided that accomplishes exhaust heat recovery and exhaust gas recirculation with a common heat exchanger used for both purposes. The apparatus includes an exhaust system through which exhaust gas is discharged from the engine. A heat exchanger is positioned within the exhaust system. Coolant flow passages are provided in thermal communication with the engine and with the heat exchanger. A bypass valve is operable in a first position to direct the exhaust gas through the heat exchanger to transfer heat to the coolant flow passages in a coolant heating mode, and operable in a second position in which the exhaust gas bypasses the heat exchanger in a bypass mode during which no significant coolant heating occurs via the heat exchanger. A portion of the exhaust gas is recirculated to the engine after cooling via the heat exchanger.

11 Claims, 4 Drawing Sheets

US 8,359,845 B2

EXHAUST HEAT RECOVERY AND EXHAUST GAS RECIRCULATION WITH COMMON HEAT EXCHANGER

TECHNICAL FIELD

The invention relates to an exhaust heat recovery system and an exhaust gas recirculation system for a vehicle.

BACKGROUND OF THE INVENTION

Rapid warm-up of engine coolant, engine oil, and transmission fluid is important to fuel economy during a cold start (i.e., when the vehicle has not been running and the engine and transmission are relatively cold). Engine warm-up is especially challenging for diesel and hybrid applications, as less fuel is burned. Exhaust gas recirculation (EGR) systems are used to reduce emissions by recirculating some of the exhaust gas back to the engine. Cooled EGR gas can improve fuel economy by allowing more spark advance. Additionally, engine warm-up may be more rapid with warm EGR gas, which may be advantageous in some engine applications.

SUMMARY OF THE INVENTION

An apparatus for a vehicle with an engine is provided that accomplishes exhaust heat recovery and exhaust gas recirculation with a common heat exchanger used for both purposes. The apparatus includes an exhaust system through which exhaust gas is discharged from the engine. A heat exchanger is positioned within the exhaust system, and coolant flow passages are provided in thermal communication with the engine and with the heat exchanger. A bypass valve is operable in a first position to direct the exhaust gas through the heat exchanger to transfer heat to the coolant flow passages in a coolant heating mode, and operable in a second position in which the exhaust gas bypasses the heat exchanger in a bypass mode during which no significant coolant heating occurs via the heat exchanger. A portion of the exhaust gas is recirculated to the engine after cooling via the heat exchanger. Thus, both exhaust gas recirculation and exhaust heat recovery thereby being accomplished via the heat exchanger, and a separate heat exchanger for cooling of recirculated exhaust gas is not required. Cost savings and reduced system complexity may be realized by the elimination of a separate heat exchanger. Additionally, mass may be reduced, improving fuel economy.

For example, the exhaust system may have an exhaust gas recirculation port in fluid communication with the engine for recirculating a portion of the exhaust gas to the engine. A portion of the exhaust gas flows through the heat exchanger for cooling prior to flowing through the exhaust gas port when the bypass valve is in the bypass mode. Various embodiments accomplish these two functions via a single heat exchanger using different exhaust gas recirculation ports, valve bodies and valves.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
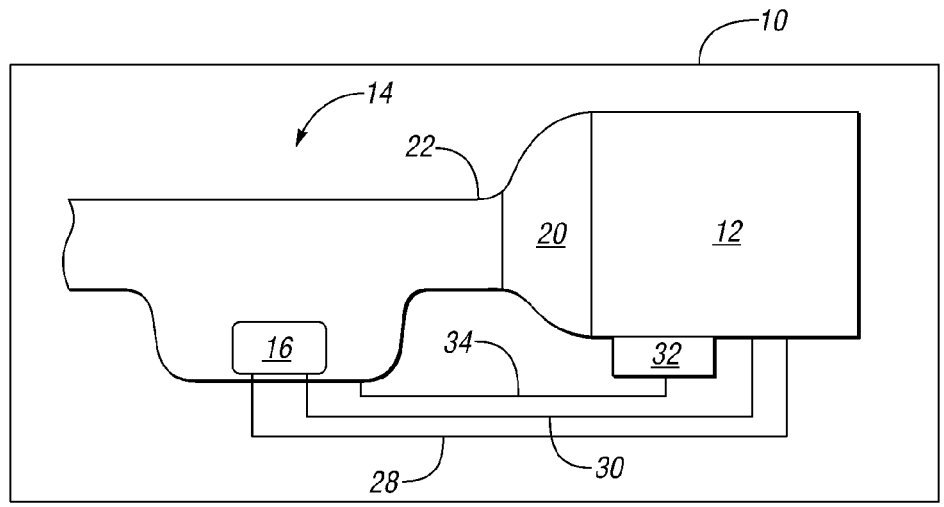
FIG. 1 is a schematic illustration of a first embodiment of a vehicle with a first embodiment of an apparatus for exhaust heat recovery and exhaust gas recirculation with a common heat exchanger.
Figure 2:
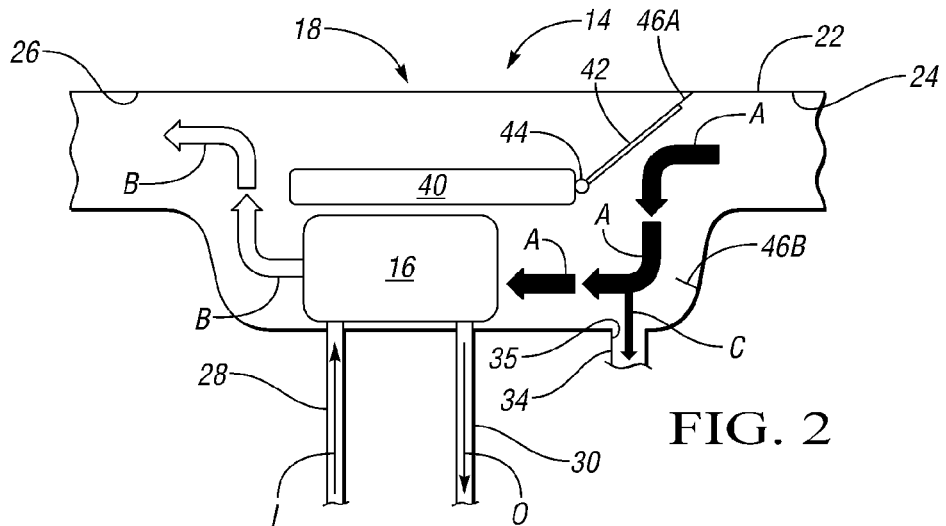
FIG. 2 is a schematic illustration of the apparatus of FIG. 1 in a coolant heating mode.

Referring to the drawings, wherein like reference numbers refer to like components throughout the several views, FIG. 1 shows a vehicle 10 that has an engine 12 for propelling the vehicle 10. The engine 10 is an internal combustion engine of the gasoline or diesel type. An apparatus 14 is operatively connected to the engine 12 and is operable to accomplish both exhaust heat recovery and exhaust gas recirculation using only a single heat exchanger 16, as shown and described further with respect to FIG. 2. The engine 12 generates exhaust gas in an exhaust system 18 that includes an exhaust manifold 20 and an exhaust pipe 22 extending therefrom. Referring to FIG. 2, the relatively hot exhaust gas exits the manifold 20 via an inlet 24 of the exhaust pipe 22 and passes through the apparatus 14 before exiting via an outlet 26 of the exhaust pipe 22. A catalytic converter (not shown) may be positioned in the exhaust system 18 between the manifold 20 and the apparatus 14. Engine coolant flows between the engine 12 and the apparatus 14 via conduits forming an engine coolant inlet flow passage 28 and an engine coolant outlet flow passage 30, as indicated by coolant flow arrows I and O. The conduits may be flexible or rigid tubing, or bored, drilled, cast or otherwise formed passages in any vehicle component. Furthermore, exhaust gas is recirculated from the apparatus 14 to an intake manifold 32 of the engine 12 via exhaust gas recirculation passage 34. The exhaust system 18 has an exhaust gas recirculation port 35 through which exhaust gas is provided to the exhaust gas recirculation passage 34, The apparatus 14 includes a wall 40 partially dividing the exhaust pipe 22. A bypass valve 30 is pivotally connected to the wall 40 and pivots about an axis extending along pivot post 44. An exhaust bypass actuator (not shown), such as an electric servo motor, is controllable to selectively move the valve 42 between the first position of FIG. 2 and the second position of FIG. 3. Alternatively, the actuator may also be a vacuum diaphragm, or a wax motor that can be activated by coolant temperature flowing therethrough (in which case the actuator might be activated without input from a controller). Stops 46A, 46B extend within the exhaust pipe 22 to limit movement of valve 42 and thereby define the first and second positions of the valve 42. An electronic controller (not shown) is operatively connected to the actuator (depending on the type of actuator used, as described above), and controls the actuator according to vehicle operating conditions received as input signals from various sensors placed on the vehicle 10, such as an exhaust heat recovery coolant temperature sensor and an engine coolant temperature sensor. The information received by the controller is indicative of such operating conditions as temperature of coolant flowing through the engine and temperature of coolant exiting the heat exchanger. The sensors may directly measure the operating conditions, or may provide information used in a predictive model that predicts or estimates these operating conditions. A person of ordinary skill in the art would readily understand the various ways to provide such information indicative of vehicle operating conditions to the controller, and would readily understand various algorithms that may be stored on the controller to process the information. Furthermore, electronically, thermally, or pneumatically actuated valves are well understood by those skilled in the art.

Referring to FIG. 2, when the valve 42 is in the first position, a coolant heating mode is established as a majority of the exhaust gas is directed through the heat exchanger 16, as indicated by flow arrows A showing exhaust gas entering the heat exchanger 16, and flow arrows B indicating exhaust gas exiting the heat exchanger 16. In the Figures, flow arrows indicating relatively warm exhaust gas are shaded, while flow arrows indicating relatively cool exhaust gas are unshaded. Some heat is transferred from the exhaust gas to the engine coolant via the heat exchanger 16, so that coolant in flow passage 30 is warmer than coolant in flow passage 28. In the coolant heating mode of FIG. 2, a small portion of the exhaust gas enters the exhaust gas recirculation passage 34 prior to passing through the heat exchanger 16, as indicated by flow arrow C. Thus, the recirculated exhaust gas indicated by arrow C is not cooled during the coolant heating mode. Relatively warm EGR gas may facilitate rapid engine warm-up.

Figure 3:
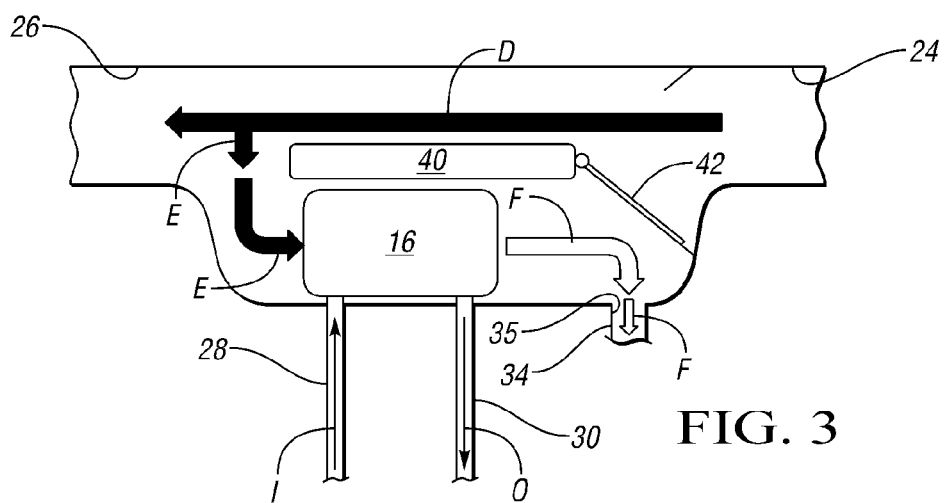
FIG. 3 is a schematic illustration of the apparatus of FIG. 1 in a heat exchanger bypass mode.

When the engine 12 is sufficiently warmed, the valve 42 is moved to a second position shown in FIG. 3 in which the flow path indicated by arrows A in FIG. 2 is blocked, and exhaust gas cannot pass to the exhaust gas recirculation passage 34 without first passing through the heat exchanger 16. When the valve 42 is in the second position, the apparatus is in a bypass mode. Exhaust gas flow is directed along an opposite side of wall 40 from the heat exchanger 16 than when the valve 42 is in the first position, as indicated by flow arrow D. Most of the exhaust gas passes out of the exhaust gas outlet 26, bypassing the heat exchanger. A small portion of the exhaust gas flows through the heat exchanger 16, as indicated by arrows E. Some heat is extracted from the exhaust gas and transferred to the engine coolant in flow passage 30; however, warming of the coolant is minimal in comparison to the coolant heating mode, because only a portion of the exhaust gas is routed through the heat exchanger 16 in the bypass mode. Accordingly the exhaust gas indicated by flow arrows F exiting the heat exchanger 16 and entering the exhaust gas recirculation passage 34 via port 35 is cooled. Thus in the bypass mode, the apparatus 14 cools recirculated exhaust gas via the common heat exchanger 16 used for heating engine coolant in the coolant heating mode.

Referring to FIGS. 4-7, another embodiment of an apparatus 114 operatively connectable to the engine 12 is operable to accomplish both exhaust heat recovery and cooled exhaust gas recirculation using only a single heat exchanger 16. Furthermore, EHR and cooled EGR are achieved during the same mode (coolant heating mode), i.e., during engine warm-up. Components of the apparatus 114 that are the same as those of apparatus 14 are referred to using like reference numbers. The apparatus 114 has an exhaust system 118 with a valve body 143 that has a first exhaust gas recirculation inlet port 145, a second exhaust gas recirculation inlet port 147, and an exhaust gas recirculation outlet port 135 that is in selective fluid communication with both the first and the second exhaust gas recirculation inlet ports 145, 147, depending on the position of valve 142. An exhaust bypass actuator (not shown), such as an electric servo motor, is controllable to selectively move the valve 142 between the first position of FIGS. 4 and 6 and the second position of FIGS. 5 and 7. The actuator may also be a wax motor or a vacuum diaphragm.

Figures 6, 7:
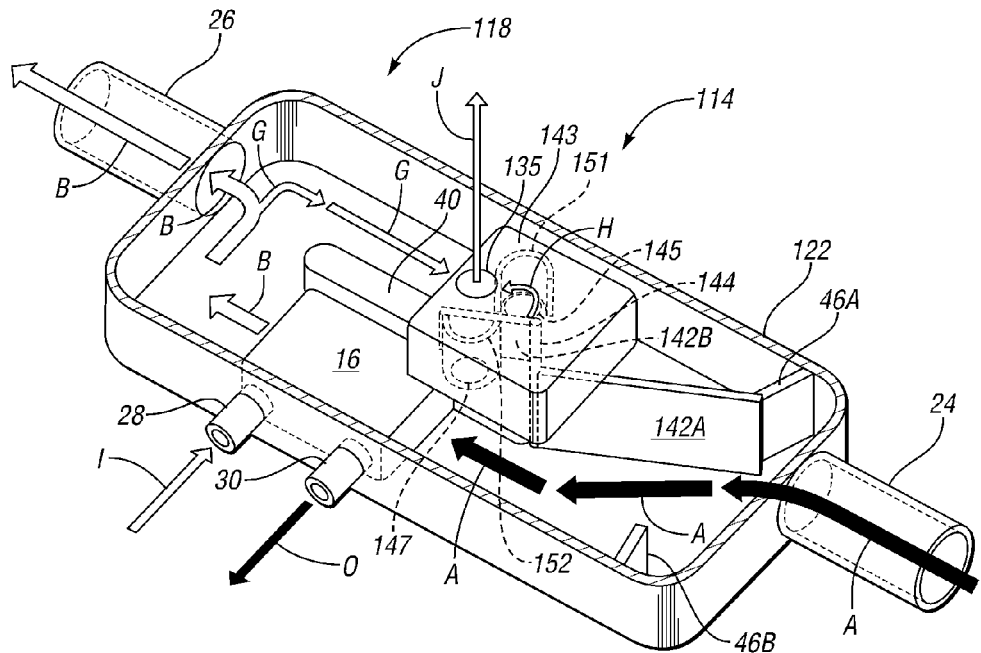
FIG. 6 is a schematic perspective illustration of the apparatus of FIG. 4 in partial cross-sectional view.
FIG. 7 is a schematic perspective illustration of the apparatus of FIG. 5 in partial cross-sectional view.

As best shown in FIGS. 6 and 7, the valve 142 has a first portion 142A extending toward the exhaust inlet 24 from pivot post 144, and a second portion 142B that extends toward the exhaust outlet 26 from the pivot post 144. The first and second portions 142A, 142B pivot in unison with one another about pivot post 144, as both are integrally connected with one another via the pivot post 144. The first portion 142A lies in a portion of the interior of exhaust pipe 122, level with the exhaust inlet 24, the wall 40 and the heat exchanger 16. The second portion 142B lies above the wall 40 within a cavity formed by the valve body 143. The valve body 143 also has barrier walls 151, 152 partially surrounding the exhaust gas recirculation inlet ports 145, 147, respectively.

Figure 4:
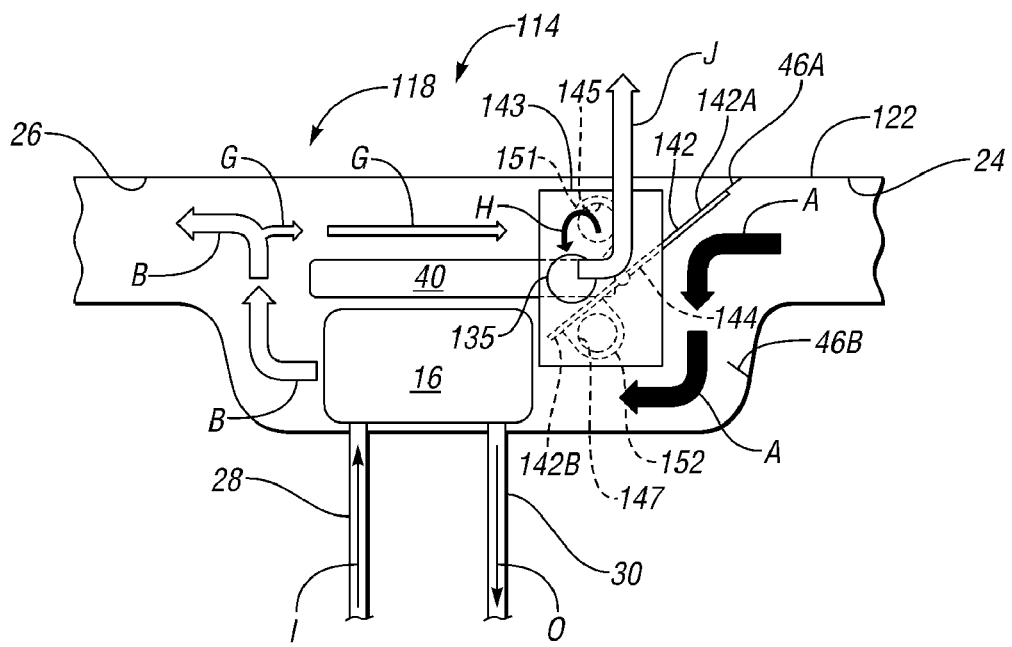
FIG. 4 is a schematic illustration of an alternative apparatus for exhaust heat recovery and exhaust gas recirculation with a common heat exchanger and in a coolant heating mode.

When the valve 142 is in the first position of FIGS. 4 and 6, valve portion 142A directs the exhaust gas from the exhaust pipe inlet 24 to flow through the heat exchanger 16, as indicated by flow arrows A and B, establishing a coolant heating mode to transfer heat from the exhaust gas to engine coolant flowing through passages 28, 30. The valve portion 142B rests against the barrier wall 152 when in the first position, thus preventing fluid communication between the exhaust gas recirculation inlet port 147 and the exhaust gas recirculation outlet port 135. A portion of the exhaust gas exiting the heat exchanger 16 flows along the opposite side of wall 40, as indicated by flow arrows G, and then flows through exhaust gas recirculation inlet port 145 to exhaust gas recirculation outlet port 135, as indicated by flow arrow H. From the exhaust gas recirculation outlet port 135, the cooled recirculated exhaust gas, indicated by flow arrow J, is directed to the engine 12 through an exhaust gas recirculation passage, not shown but similar to passage 34 of FIG. 1. Thus, during the coolant heating mode, cooled exhaust gas recirculation is accomplished using exhaust gas cooled via the same heat exchanger 16 as used for coolant heating.

Figure 5:
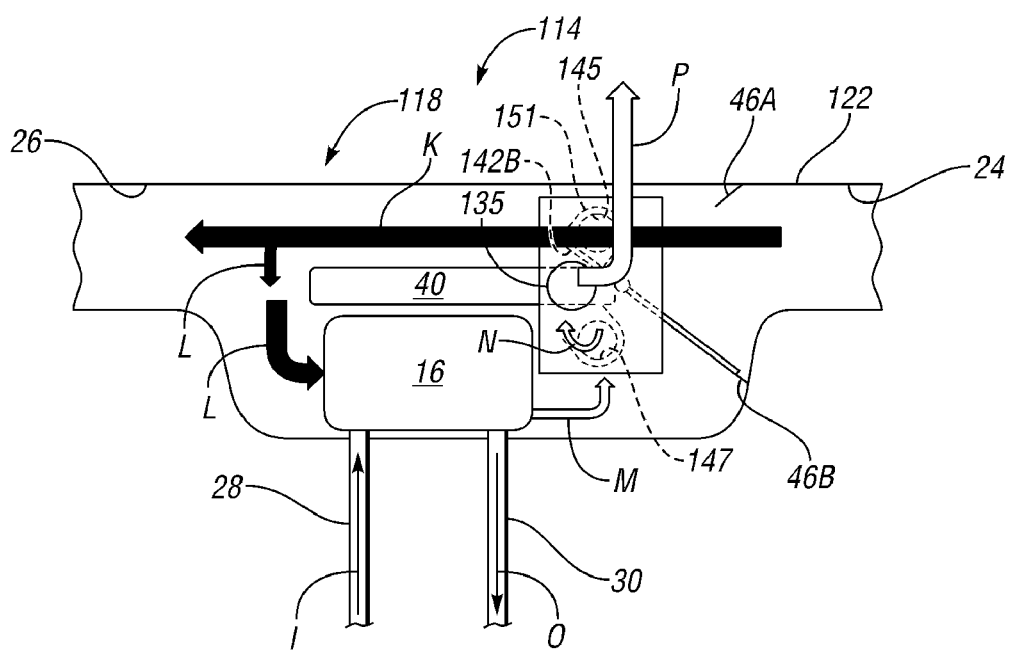
FIG. 5 is a schematic illustration of the apparatus of FIG. 4 in a heat exchanger bypass mode.

When the engine 12 is sufficiently warmed, the valve 142 is moved to the second position of FIGS. 5 and 7, and valve portion 142A directs the exhaust gas from the exhaust pipe inlet 24 to the opposite side of wall 40 from the heat exchanger 16, as indicated by flow arrows K, establishing a bypass mode in which most of the exhaust gas passes out of the exhaust gas outlet 26, bypassing the heat exchanger 16. The valve portion 142B rests against the barrier wall 151 when in the second position, thus preventing fluid communication between the exhaust gas recirculation inlet port 145 and the exhaust gas recirculation outlet port 135. A portion of the exhaust gas flows around the wall 40, as indicated by flow arrows L, and then flows through heat exchanger 16, as indicated by flow arrow M. This small cooled portion of exhaust gas then flows through the exhaust gas recirculation inlet port 147, as indicated by flow arrow N, and then through the exhaust gas recirculation outlet port 135 (as indicated by flow arrow P), which is in fluid communication with inlet port 147 when the valve 142 is in the second position. From the exhaust gas recirculation outlet port 135, the cooled recirculated exhaust gas is directed to the engine 12 through an exhaust gas recirculation passage, not shown but similar to passage 34 of FIG. 1. Thus, during the bypass mode, exhaust gas recirculation is also accomplished using exhaust gas cooled via the same heat exchanger 16 as used for heating coolant in the coolant heating mode. Exhaust gas recirculation flow is directed to the engine 12 generally perpendicular to exhaust flow through the exhaust system 118, as indicated by flow arrows J and P generally perpendicular to flow arrows A, B, G, K, L and M.

Figure 8:
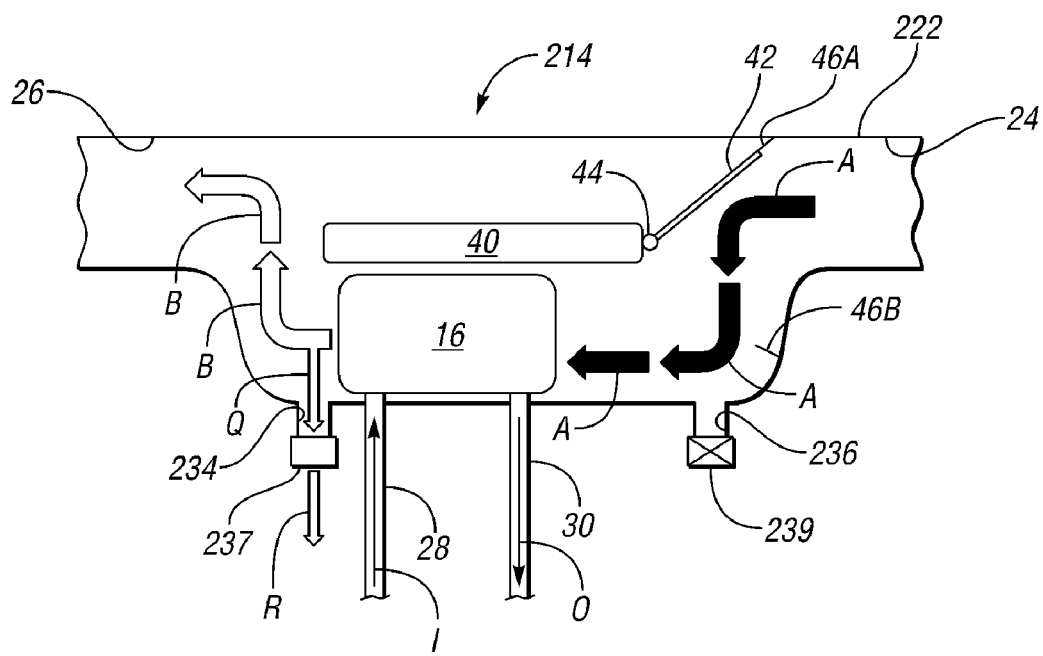
FIG. 8 is a schematic illustration of another alternative apparatus for exhaust heat recovery and exhaust gas recirculation with a common heat exchanger and in a coolant heating mode.
Figure 9:
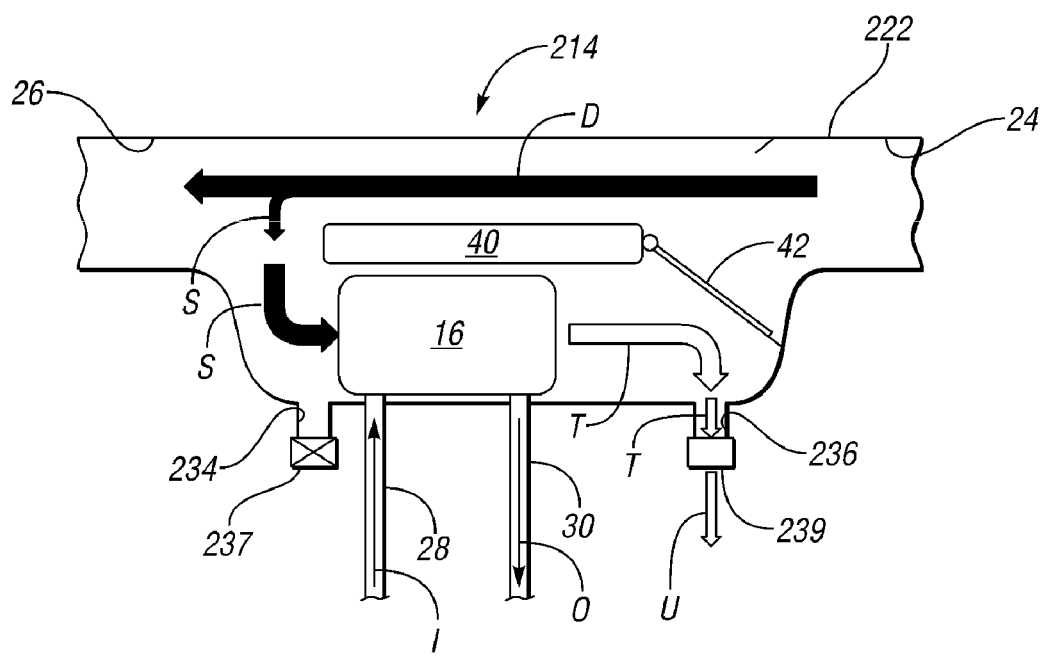
FIG. 9 is a schematic illustration of the apparatus of FIG. 8 in a heat exchanger bypass mode.

Referring to FIGS. 8 and 9, another embodiment of an apparatus 214 operatively connectable to the engine 12 is operable to accomplish both exhaust heat recovery and exhaust gas recirculation using only a single heat exchanger 16. EHR and cooled EGR are both accomplished during the same mode (engine warm-up). Components of the apparatus 214 that are the same as those of apparatus 14 are referred to using like reference numbers.

The apparatus 214 includes an exhaust pipe 222 having exhaust inlet 24 and exhaust outlet 26. The exhaust pipe 222 forms a first exhaust gas recirculation port 234 and a second exhaust gas recirculation port 236 on an opposing side of the heat exchanger 16 from the first exhaust gas recirculation port 234. A first exhaust gas recirculation valve 237 is positioned in the first exhaust gas recirculation port 234 and is selectively openable and closable, such as via an electronic control signal from a controller (not shown). When the first exhaust gas recirculation valve 237 is opened, exhaust flow through the first exhaust gas recirculation port 234 is permitted. When the first exhaust gas recirculation valve 237 is closed, exhaust flow through the first exhaust gas recirculation port 234 is not permitted. In FIGS. 8 and 9, an "X" through valve 237 or 239 indicates that the valve is closed.

Similarly, a second exhaust gas recirculation valve 239 is positioned in the second exhaust gas recirculation port 236 and is selectively openable and closable, such as via an electronic control signal from a controller (not shown). When the second exhaust gas recirculation valve 239 is opened, exhaust flow through the second exhaust gas recirculation port 236 is permitted. When the second exhaust gas recirculation valve 239 is closed, exhaust flow through the second exhaust gas recirculation port 236 is not permitted.

When the valve 42 is in the first position shown in FIG. 8, a coolant heating mode is established as a majority of the exhaust gas is directed through the heat exchanger 16, as indicated by flow arrows A showing exhaust gas entering the heat exchanger 16, and flow arrows B indicating exhaust gas exiting the heat exchanger 16. Some heat is transferred from the exhaust gas to the engine coolant via the heat exchanger 16, so that coolant in flow passage 30 is warmer than coolant in flow passage 28. When the valve 42 is in the first position, exhaust gas recirculation valve 237 is opened, and exhaust gas recirculation valve 239 is closed. A small portion of the exhaust exiting the heat exchanger flows through the exhaust gas recirculation port 234, as indicated by flow arrow Q, and is directed to the engine 12 through open valve 237, as indicated by flow arrow R, and through an exhaust gas recirculation passage, not shown but similar to passage 34 of FIG. 1. Thus in the coolant heating mode, the apparatus 214 accomplishes recirculation of cooled exhaust gas via the common heat exchanger 16.

When the engine 12 is sufficiently warmed, the valve 42 is moved to a second position shown in FIG. 9 in which the flow path indicated by arrows A in FIG. 8 is blocked. When the valve 42 is in the second position, the apparatus 214 is in a bypass mode. Exhaust gas flow is directed along an opposite side of wall 40 from the heat exchanger 16 than when the valve 42 is in the first position, as indicated by flow arrow D. Most of the exhaust gas passes out of the exhaust gas outlet 26, bypassing the heat exchanger 16. A small portion of the exhaust gas flows through the heat exchanger 16, as indicated by arrows S. Some heat is extracted from the exhaust gas and transferred to the engine coolant in flow passage 30; however, warming of the coolant is minimal in comparison to the coolant heating mode, because only a portion of the exhaust gas is routed through the heat exchanger 16 in the bypass mode. When the valve 42 is in the second position, exhaust gas recirculation valve 239 is opened, and exhaust gas recirculation valve 237 is closed. Accordingly the exhaust gas indicated by flow arrows T exits the heat exchanger and is directed to the engine 12 through exhaust gas recirculation port 236 and open valve 239, as indicated by flow arrow U, and through an exhaust gas recirculation passage, not shown but similar to passage 34 of FIG. 1. The exhaust gas entering the recirculation port 236 is cooled. Thus, in the bypass mode, the apparatus 214 accomplishes recirculation of cooled exhaust gas via the common heat exchanger 16.

While the best modes for carrying out the invention have been described in detail, those familiar with the art to which this invention relates will recognize various alternative designs and embodiments for practicing the invention within the scope of the appended claims.

The invention claimed is:

1. An apparatus for a vehicle with an engine comprising:
   an exhaust system through which exhaust gas is discharged from the engine;
   a heat exchanger positioned within the exhaust system;
   coolant flow passages in thermal communication with the engine and with the heat exchanger;
   a bypass valve operable in a first position to direct the exhaust gas through the heat exchanger to transfer heat to the coolant flow passages in a coolant heating mode, and operable in a second position in which the exhaust gas bypasses the heat exchanger in a bypass mode during which no significant coolant heating occurs via the heat exchanger; and
   wherein a portion of the exhaust gas is recirculated to the engine after cooling via the heat exchanger.

2. The apparatus of claim 1, further comprising a valve body having a first and a second exhaust gas recirculation inlet port and an exhaust gas recirculation outlet port in alternative selective fluid communication with the exhaust gas recirculation inlet ports;
   wherein the first exhaust gas recirculation inlet port is in fluid communication with the exhaust gas downstream of the heat exchanger and is in fluid communication with the exhaust gas recirculation outlet port and the second exhaust gas recirculation inlet port is closed by the bypass valve so as to be out of fluid communication with the exhaust gas recirculation outlet port when the bypass valve is in the first position; and
   wherein the second exhaust gas recirculation inlet port is in fluid communication with the exhaust gas downstream of the heat exchanger and is in fluid communication with the exhaust gas recirculation outlet port and the first exhaust gas recirculation inlet port is closed by the bypass valve so as to be out of fluid communication with the exhaust gas when the bypass valve is in the second position; cooling of recirculated exhaust gas thereby being accomplished by the heat exchanger in both the coolant heating mode and the bypass mode.

3. The apparatus of claim 1, wherein the exhaust system has a first exhaust gas recirculation port in fluid communication with the engine for recirculating a portion of the exhaust gas to the engine; wherein the exhaust gas flows through the heat exchanger prior to the first exhaust gas recirculation port when the bypass valve is in the first position; and further comprising:

a first exhaust gas recirculation valve positioned in the first exhaust gas recirculation port and selectively openable and closable;
wherein the exhaust system has a second exhaust gas recirculation port on an opposing side of the heat exchanger from the first exhaust gas recirculation port for recirculating a portion of the exhaust gas to the engine; wherein the exhaust gas flows through the heat exchanger prior to the second exhaust gas recirculation port when the bypass valve is in the second position;
a second exhaust gas recirculation valve positioned in the second exhaust gas recirculation port and selectively openable and closable; and
wherein the first exhaust gas recirculation valve is open when the bypass valve is in first position and is closed when the bypass valve is in the second position; and
wherein the second exhaust gas recirculation valve is open when the bypass valve is in second position and is closed when the bypass valve is in the first position, cooling of recirculated exhaust gas thereby being accomplished by the heat exchanger in the coolant heating mode and in the bypass mode.

4. An apparatus for a vehicle with an engine comprising:
an exhaust system through which exhaust gas is discharged from the engine;
a heat exchanger positioned within the exhaust system;
coolant flow passages in thermal communication with the engine and with the heat exchanger;
a bypass valve operable in a first position to direct the exhaust gas through the heat exchanger to transfer heat to the coolant flow passages in a coolant heating mode, and operable in a second position in which the exhaust gas bypasses the heat exchanger in a bypass mode during which no significant coolant heating occurs via the heat exchanger;
a valve body that has a first exhaust gas recirculation inlet port, a second exhaust gas recirculation inlet port, and an exhaust gas recirculation outlet port that is in selective fluid communication with both the first and the second exhaust gas recirculation inlet ports depending on the position of the bypass valve; and
wherein a portion of the exhaust gas is recirculated to the engine through the valve body after cooling via the heat exchanger.

5. The apparatus of claim 4, wherein the exhaust gas recirculation port is configured so that exhaust gas flow through the exhaust gas recirculation outlet port is substantially perpendicular to exhaust gas flow through the exhaust system; and
wherein the exhaust gas recirculation outlet port is configured so that exhaust gas flow through the exhaust gas recirculation outlet port is substantially perpendicular to exhaust gas flow from the exhaust gas system inlet to the exhaust gas system outlet.

6. An apparatus for a vehicle with an engine comprising:
an exhaust system through which exhaust gas is discharged from the engine;
a heat exchanger positioned within the exhaust system;
coolant flow passages in thermal communication with the engine and with the heat exchanger;
a bypass valve operable in a first position to direct the exhaust gas through the heat exchanger to transfer heat to the coolant flow passages in a coolant heating mode, and operable in a second position in which the exhaust gas bypasses the heat exchanger in a bypass mode during which no significant coolant heating occurs via the heat exchanger; and wherein the exhaust system has an exhaust gas recirculation port in fluid communication with the engine for recirculating a portion of the exhaust gas to the engine; and wherein a portion of the exhaust gas flows through the heat exchanger for cooling prior to flowing through the exhaust gas port when the bypass valve is in the bypass mode, exhaust gas recirculation and exhaust heat recovery thereby being accomplished via the heat exchanger.

7. The apparatus of claim 6, wherein the exhaust gas flows through the heat exchanger prior to flowing through the exhaust gas port only when the bypass valve is in the bypass mode, exhaust gas recirculation and exhaust gas heat recovery thereby being accomplished alternately according to the position of the bypass valve.

8. The apparatus of claim 6, wherein the exhaust gas recirculation port is a first exhaust gas recirculation port; wherein the exhaust gas flows through the heat exchanger prior to the first exhaust gas recirculation port when the bypass valve is in the first position; and further comprising:
a first exhaust gas recirculation valve positioned in the first exhaust gas recirculation port and selectively openable and closable;
wherein the exhaust system has a second exhaust gas recirculation port on an opposing side of the heat exchanger from the first exhaust gas recirculation port for recirculating a portion of the exhaust gas to the engine; wherein the exhaust gas flows through the heat exchanger prior to the second exhaust gas recirculation port when the bypass valve is in the second position;
a second exhaust gas recirculation valve positioned in the second exhaust gas recirculation port and selectively openable and closable;
wherein the first exhaust gas recirculation valve is open when the bypass valve is in the first position and is closed when the bypass valve is in the second position; and
wherein the second exhaust gas recirculation valve is open when the bypass valve is in the second position and is closed when the bypass valve is in the first position, cooling of recirculated exhaust gas thereby being accomplished by the heat exchanger in the coolant heating mode and in the bypass mode.

9. The apparatus of claim 6, wherein the exhaust system has an exhaust gas system inlet and an exhaust gas system outlet, with exhaust gas from the engine flowing from the exhaust gas system inlet to the exhaust gas system outlet, and further comprising:
a wall positioned in the exhaust system between the exhaust gas system inlet and the exhaust gas system outlet; and wherein the bypass valve is pivotably attached to the wall and pivots between the first position and the second position to direct exhaust flow on opposing sides of the wall.

10. The apparatus of claim 6, further comprising:
a valve body having a first and a second exhaust gas recirculation inlet port and an exhaust gas recirculation outlet port in alternative selective fluid communication with the exhaust gas recirculation inlet ports;
wherein the first exhaust gas recirculation inlet port is in fluid communication with the exhaust gas downstream of the heat exchanger and is in fluid communication with the exhaust gas recirculation outlet port and the second exhaust gas recirculation inlet port is closed by the bypass valve so as to be out of fluid communication with the exhaust gas recirculation outlet port when the bypass valve is in the first position; and wherein the second exhaust gas recirculation inlet port is in fluid communication with the exhaust gas downstream of the heat exchanger and is in fluid communication with the exhaust gas recirculation outlet port and the first exhaust gas recirculation inlet port is closed by the bypass valve so as to be out of fluid communication with the exhaust gas when the bypass valve is in the second position, cooling of recirculated exhaust gas thereby being accomplished by the heat exchanger in both the coolant heating mode and the bypass mode.

11. The apparatus of claim 10, wherein the exhaust gas recirculation port is configured so that exhaust gas flow through the exhaust gas recirculation outlet port is substantially perpendicular to exhaust gas flow through the exhaust system; and wherein the exhaust gas recirculation outlet port is configured so that exhaust gas flow through the exhaust gas recirculation outlet port is substantially perpendicular to exhaust gas flow from the exhaust gas system inlet to the exhaust gas system outlet.

* * * * *